J. BOHAN.
MOTOR VEHICLE.
APPLICATION FILED JUNE 24, 1915.
1,188,885.
Patented June 27, 1916.
2 SHEETS—SHEET 2.
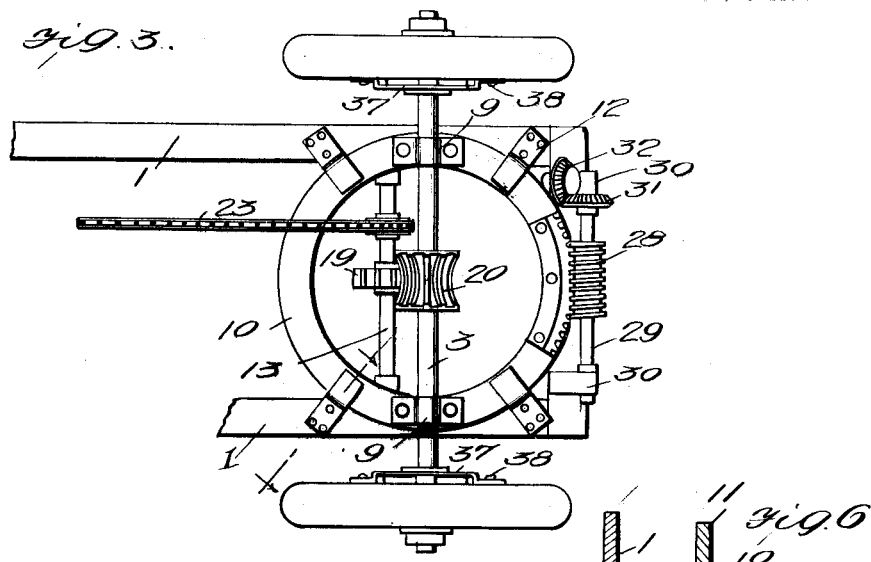
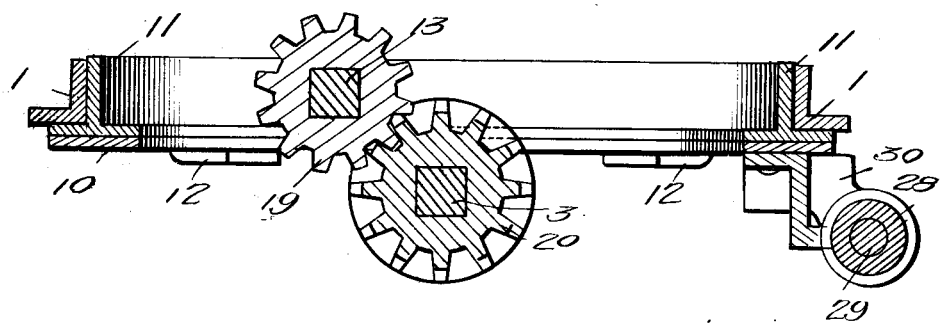
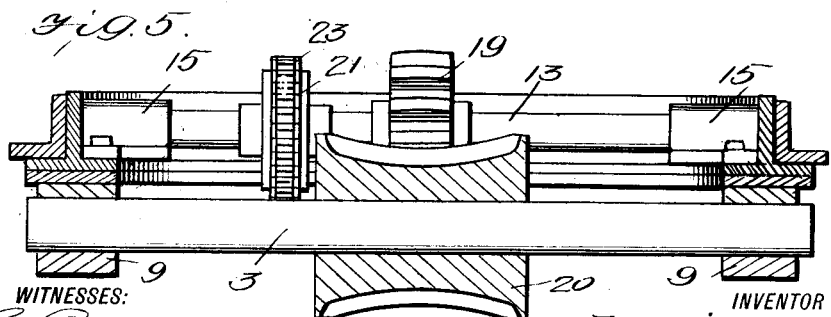
WITNESSES:
INVENTOR
Jeremiah Bohan
BY Munn & Co.
ATTORNEYS

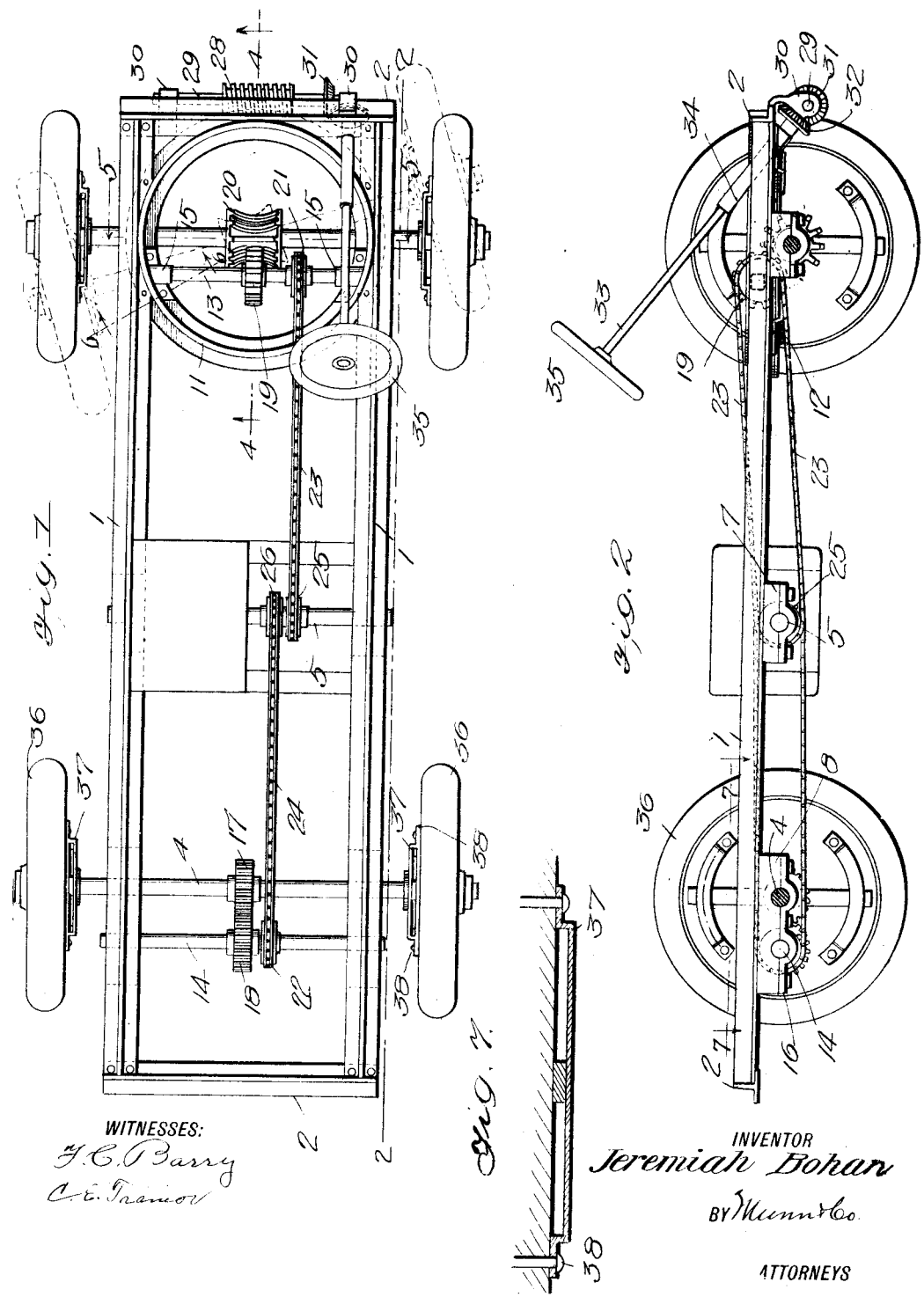

UNITED STATES PATENT OFFICE.

JEREMIAH BOHAN, OF NEW HARTFORD, IOWA.

MOTOR-VEHICLE.

1,188,885.　　　　　Specification of Letters Patent.　　Patented June 27, 1916.

Application filed June 24, 1915. Serial No. 36,114.

*To all whom it may concern:*

Be it known that I, JEREMIAH BOHAN, a citizen of the United States, and a resident of New Hartford, in the county of Butler and State of Iowa, have invented a new and useful Improvement in Motor-Vehicles, of which the following is a specification.

My invention is an improvement in motor vehicles, and the invention has for its object to provide mechanism in connection with motor vehicles of every character, for applying the power of the motor directly to the four wheels, without interference with the steering of the vehicle.

A further object is to provide mechanism in connection with the front axle for steering the vehicle, by swinging the axle, thus dispensing with the usual pivoted spindle, and providing for greater strength in the axle.

In the drawings:—Figure 1 is a top plan view of a motor vehicle provided with the improvement. Figs. 2, 4, 5 and 6 are sections on the lines 2—2, 4—4, 5—5 and 6—6 respectively of Fig. 1, each looking in the direction of the arrow adjacent the line. Fig. 3 is a bottom plan view of the front of the vehicle, and Fig. 7 is a section on the line 7—7 of Fig. 2.

The present embodiment of the invention is shown in connection with a motor vehicle having a frame of substantially rectangular form and consisting of parallel side members 1, and connected end members 2, the said side and end members being T-shaped in cross section as shown. A front axle 3 is arranged transversely of the front end of the frame, and a rear axle 4 is arranged transversely of the rear end of the frame. Wheels are mounted on the ends of the axle in a manner to be presently described, and a driving shaft 5 is journaled transversely of the frame at the center thereof in sectional bearings 7, which are secured to the side members 1, of the frame.

The rear axle is journaled in bearings 8 on the side members 1 of the frame, and both axles as shown are polygonal in cross section, square in the present instance, portions of the axles being rounded at the bearings for permitting them to turn freely in the bearings. The front axle 3 is journaled in sectional bearings 9 on a ring 10, the said axle being arranged diametrically of the ring, and this ring is mounted to move or to revolve on a ring 11, which is secured to the frame 1—2 within the same and at the front thereof. The ring 11 is T-shaped in cross section arranged with the rib upward and the ring 10 is held in contact with the ring 11 by means of clips 12. Each clip is secured at one end to the frame and the other end underlies the ring 10, holding the said ring in contact with the ring 11, but permitting the ring 10 to move angularly with respect to the ring 11.

It will be understood that if desired ball or roller bearings may be arranged between the rings, and it will be evident from the description that when the ring 10 is turned with respect to the ring 11, the axle will also be turned angularly with respect to the long axis of the frame. Counter shafts 13 and 14 are journaled on the frame transversely thereof, the shaft 13 being adjacent to the front axle, and the shaft 14 being adjacent to the rear axle. The shaft 13 is journaled in sectional bearings 15 on the ring 11, the said shaft being inside the vertical rib of the ring. The counter shaft 14 is journaled in sectional bearings 16 on the side members of the frame, and this shaft 14 is connected to the axle 4 by means of gear wheels 17 and 18 on the axle and on the counter shaft respectively and meshing with each other. A gear wheel 19 is arranged on the counter shaft 13, and this gear wheel meshes with a gear wheel 20 on the front axle. In the present instance, the gear wheels 17, 18, 19 and 20 have polygonal openings fitting the shafts and axles, so that they will turn with the shafts and axles, but it is obvious that they might be geared to the shafts and axles, or otherwise held in place, if found desirable or advisable. Suitable means is also provided for preventing longitudinal movement of the gears with respect to the shafts and axles, and it will be noticed from an inspection of Figs. 1 and 3, that the gear 20 is recessed peripherally on an arc, whose center is the center of the gear wheel 19, the arrangement being such that the axle or gear wheel may move angularly with respect to the counter shaft 13 or gear wheel 19 without causing the gear wheels to bind or become disengaged, and to secure contact between the gear wheels, whatever the position of the axle with respect to the frame.

Sprocket wheels 21 and 22 are secured to the front and the rear axles respectively, and these wheels are connected by chains 23 and 24 with sprocket wheels 25 and 26 on the driving shaft 5. It will be evident from the description that when the driving shaft 5 is driven in the usual manner from the motor that the countershafts 13 and 14 will be driven at the same speed for the wheels 21, 22, 25 and 26 are of the same size, and the axles 3 and 4 will be driven from the countershafts, the axle 3 through the gears 19 and 20, and the axle 4 through the gears 17 and 18.

To steer the vehicle the front axle 3 is swung and in order to swing the same, the ring 10 is provided with a series of worm teeth 27, which are engaged by a worm 28 on a worm shaft 29, journaled in bearing brackets 30 in front of the front cross member 2 of the frame. The shaft 29 is polygonal in cross section, and the worm has an opening fitting the shaft and the worm is held from movement longitudinally of the shaft in any suitable or desired manner.

Near the right end of the shaft 29 a bevel gear 31 is arranged thereon and this gear meshes with a bevel gear 32 on a steering post 33, which is journaled in a sleeve 34, supported on the frame in any suitable or desired manner, and provided at its upper end with a wheel 35. It will be evident from the description that when the post 33 is oscillated by means of the wheel 35 the worm shaft 29 will also be oscillated and through the engagement of the worm with the teeth on the ring 10 the ring will be revolved to swing the axle 3. Whatever the position of the ring 10 with respect to the ring 11, the driving connection between the gears 19 and 20 is not affected, and since the countershaft 13 is fixed so far as swinging movement is concerned, it will always be driven at the same rate of speed by the shaft 5.

In operation, the driving shaft 5 is driven by the motor and through the sprocket chains 23 and 24, the countershafts 13 and 14 are driven. The countershaft 14 drives the rear axle through the gears 17 and 18, while the countershaft 13 drives the front axle through the gears 19 and 20. When it is desired to turn the vehicle, the wheel 35 is turned in the proper direction to rotate the shaft 29. Through the engagement of the worm 28 with the teeth 27 on the ring 10, the ring will be oscillated, the direction of oscillation depending upon the direction in which the wheel 35 is turned. Because of the peculiar construction of the gears 19 and 20 they intermesh properly regardless of the position of the axle with respect to the ring, that is, with respect to the countershaft 13.

I claim:

1. In a motor vehicle, the combination with the frame, of a rear axle journaled on the frame, a fifth wheel at the front of the frame and comprising a pair of superposed rings movable angularly with respect to each other, means for moving the lower ring in either direction, the front axle being journaled diametrically of the lower ring and the upper ring being rigid with the frame, a countershaft journaled on the said last-named ring in rear of the front axle, a countershaft journaled on the frame in rear of the rear axle, a driving shaft journaled on the frame intermediate the countershafts and having a driving connection with each countershaft, and a gear connection between each countershaft and the adjacent axle.

2. In a four-wheeled driven motor vehicle, a frame, a fifth wheel at one end of the frame, a front axle mounted upon the fifth wheel and movable angularly therewith, a forward countershaft mounted upon the frame and geared to the front axle, a rear axle and a rear countershaft mounted upon the frame and geared for rotation, an intermediate power driven shaft, and connecting means between the two countershafts and the power driven shaft for driving the three shafts in the same general direction.

JEREMIAH BOHAN.